Patented June 3, 1952

2,599,373

UNITED STATES PATENT OFFICE 2,599,373

THIXOTROPIC GEL FOR PRESERVING WOOD

Roman H. Chrzanowski, Buffalo, N. Y., assignor to Osmose Wood Preserving Co. of America, Inc., Buffalo, N. Y., a corporation of New York No Drawing. Application January 11, 1949, Serial No. 70,369

7 Claims. (Cl. 167—38.7)

This invention relates to a process and composition for the preservation of wood and includes correlated improvements designed to enhance the application and increase the effectiveness of the composition.

It is known to mix wood preserving chemicals with water or bitumen-like materials to form a solution or suspension for preservative application to wood. Such composition has a limited method of application; for example, when applied to a vertical surface much of the solution or suspension runs down the surface and is lost in the ground. Further, although such solutions and suspensions afford a high initial concentration of the preservative chemicals, some do not adequately resist leaching or/and washing away by water, such as rain, ground moisture, etc. Further, it is known to add to the aqueous mixtures a colloidal thickening agent to form a stiff paste which may be applied to a vertical surface. However, if the paste is made viscous enough to resist running off the surface and tacky enough to adhere to the surface properly, it will be found to be so viscous that it cannot be spread readily with a brush, but requires special equipment for application to an area of the surface. Further, such paste-like aqueous compositions cannot be applied at temperatures below the freezing points of such mixtures. Further, such paste-like aqueous compositions are not resistant to leaching or/and washing away by water so that the salts are lost after one or two exposures to such water. Further, it has not heretofore been possible to apply the non-aqueous compositions at temperatures below about 50° F. to 45° F. without first heating said compositions.

It is a general object of the present invention to provide a paste-like composition for preserving wood which can be applied to a vertical, inclined or horizontal surface without running off, and can be spread readily by means of an ordinary brush, and which after spreading will be resistant to rapid leaching or/and washing away of the water-soluble ingredients by water, such as rain, ground moisture, etc.

It is a further object of the invention to provide a process for the application of the wood-preserving composition to the wood as a stiff, viscous, paste-like mass, yet enabling the mass to be spread over the surface of the wood by brushing without rendering the mass susceptible to leaching or/and washing away by water.

A further object of the invention is the provision of a wood-preserving composition which can be applied by spraying but which will not run down vertical surfaces to which it is applied by spraying.

A specific object of the invention is to provide a wood-preserving composition containing finely divided particles of organic and inorganic wood-preserving chemicals which will remain in suspension and will not settle out on standing and yet permit the application of the composition to wood by brushing, spraying, soaking or dipping, without or with pressure.

Other objects of the invention will be obvious and will appear hereinafter.

According to the present invention there is provided a wood-preserving composition comprising a wood preservative mixture dispersed in a thixotropic gel, the composition being non-settling and non-flowing on standing but being rendered fluid by agitation to permit application to wood by brushing, spraying, dipping or pressure impregnation. In one embodiment, the thixotropic gel composition is a non-aqueous system as used, and in a second embodiment the thixotropic gel composition is an aqueous system as used. In each embodiment the preservative materials may be inorganic or/and organic and water-soluble or water-insoluble, preferably in the form of finely dispersed particles suspended in the thixotropic gel. The invention also includes a process for applying preservative to wood which consists of subjecting a thixotropic wood-preservative composition to agitation and applying said composition to wood while the composition is in a flowable condition, thereafter allowing the composition to return to a substantially non-flowable condition, the water-soluble components in the composition penetrating into the wood by osmotic diffusion.

The composition and process of the invention are particularly designed for the preservation of wood containing moisture, especially freshly cut green wood, but it may be applied to partly seasoned or completely seasoned wood which will later absorb moisture. Freshly cut green wood should be partially or entirely debarked, and the composition applied to the moist wood. If the wood to be preserved does not contain sufficient moisture for immediate commencement of osmotic diffusion, the wood can be moistened sufficiently by dipping in or spraying with water, or by steam-treating it. The composition may be applied to any exterior surfaces or interior zones of standing poles, posts, piles and timbers where they have absorbed or will absorb moisture from the ground or atmosphere. While the invention will be described in connection with the treatment of wood containing substantial moisture, it is to be understood that the invention is not so limited.

The thixotropic gel used in the composition may be either aqueous or non-aqueous. When the gel is aqueous it may be formed of hydrophilic colloids, such, for example, as gelatin, water-soluble gums, sodium silicate (water-glass), water-soluble and water-insoluble or alkali-soluble cellulose ethers, and the like, as well as water-soluble polyvinyl alcohol and polyvinyl acetate. These colloidal substances are dispersed in water to form a colloidal dispersion, and then converted into a thixotropic gel structure by conventional means; for example, by heating a dispersion of polyvinyl alcohol or polyvinyl acetate the particle size of the dispersed phase is changed until the gel becomes thixotropic (its fluidity increases rapidly on agitation and shear), and partial neutralization with acid of a cellulose ether dispersed in caustic soda will result in a thixotropic gel structure being produced. Further, the thixotropic gel may be produced by dispersing in the colloidal system molten wax, which is precipitated as fine particles. To the aqueous thixotropic gel so produced, the wood preservative chemicals are added in the proper proportions.

However, in the preferred embodiment, the thixotropic gel is a non-aqueous organic system, which may be formed by dispersing an organic substance such, for example, as higher fatty acids as a class and salts of the higher fatty acids, for example, aluminum, magnesium and zinc salts of the fatty acids, for example, stearic, oleic, lauric acids, in an organic liquid which has a limited solubility for such dispersed materials, suitable organic liquids comprising liquid coal tar fractions, petroleum and petroleum fractions which are liquids, for example, coal tar hydrocarbons, and petroleum naphtha, also semi-solid or fluent pitches, bitumen, asphalt and coal tar pitch. When one of the semi-solid pitches is selected as the dispersion medium it may be rendered fluid by heating and/or by diluting it with a suitable thinner such as a coal tar or petroleum naphtha. The dispersed phase and the dispersion medium are selected so that they are miscible at an elevated temperature, i. e. at above 20° C. but have only a limited solubility in each other at room temperature, and the amount of the dispersed phase should be such that its solubility in the dispersion medium is exceeded at room temperature, whereupon the dispersed material is thrown out in the form of fine particles, thus resulting in a thixotropic gel structure. It should also be noted that the dispersed material is preferably a polar molecule, such molecules showing a tendency to agglomerate or flocculate on standing in the dispersion. All these gel structures show the characteristic of being reduced through mechanical agitation to a state of relatively high fluidity with little structural resistance to flow. After formation of the thixotropic gel it is combined with the wood preservative chemicals as hereinafter described.

The water-soluble wood preservative used in the composition of the invention may be either an organic and/or an inorganic substance such, for example, as the mycocide salts and insecticides. Suitable inorganic salts are those which are soluble in water, for example, the soluble fluorides of sodium, potassium and ammonium, zinc chloride, copper sulphate, mercuric chloride, as well as soluble arsenates, chromates, bichromates and chromated zinc chloride and zinc silicofluoride, and the like. In lieu of, or in addition to the water-soluble preservatives there may be employed organic wood preservatives such, for example, as dinitrophenol, dinitrocresol, trinitrophenol, para chlorphenol, and the like.

When it is desired to increase the viscosity of the composition there may be added inert and insoluble fibres and mineral fillers. The fibres may comprise either cellulosic fibres such as rayon, natural wood or cotton fibres, and non-cellulosic fibres such, for example, as asbestos fibres, mineral wool, glass fibre waste and the like, of which asbestos fibres are preferred. In order to render the composition flowable for brushing, spraying and dipping, the fibres should be short, a suitable length for brushing being $\frac{1}{64}$ to $\frac{1}{8}$ inch. The inert fillers may be, for example, bentonite clay, diatomaceous earth, coal dust, sand, and the like.

Further, when the viscosity is to be reduced, small amounts of inert diluents may be added to the composition, such, for example, as light petroleum fractions, light coal tar naphtha and the like, but it should be understood that the composition is at room temperature and in the absence of agitation, a stiff, paste-like mass. In this form it is capable of adhering to a vertical surface without dripping or running, but upon brushing may be readily spread, after which it again rapidly assumes its non-flowable condition. Continuous agitation causes it to become fluid, in which condition it can be readily sprayed.

The various ingredients of the composition are mixed together according to the following procedure:

The thixotropic gel is formed either alone and separate from the wood preservative chemicals and other ingredients, or in combination with certain of these. By way of illustration but not by way of limiting the invention, the procedure will be given for the formation of a non-aqueous thixotropic gel composition containing both inorganic and organic wood preservatives and inert fibres:

In a vessel 12.5 lbs. of aluminum stearate (the wax-like dispersed phase) is mixed with 240 lbs. of cold tar naphtha sp. gr. approximately 0.970 (the dispersion medium) and the mixture stirred for five minutes, then heated to 60° C. with stirring for another 15 minutes. The colloidal dispersion so formed is fluid while hot. The hot composition is allowed to cool and becomes a stiff thixotropic gel which is substantially solid at room temperature but upon agitation becomes flowable.

In a separate vessel there are mixed 536 lbs. of coal tar minimum sp. gr. about 1.08, average about 1.17, 56 lbs. dinitrophenol, 34 lbs. potassium dichromate and 33 lbs. of asbestos fibres having a length of $\frac{1}{8}$ inch and in loose condition. To this mixture there is added, at room temperature, one-half the amount of thixotropic gel formed above, i. e. about 125 lbs. with vigorous stirring. Then 765 lbs. of sodium fluoride are added over a period of 10 minutes with continuous stirring, after which the mixture is stirred for an additional period, for example, 15 minutes, to promote uniformity of mixing. Now the balance, i. e. 125 lbs. of the thixotropic gel is added to the mixture with stirring, and the stirring continued until the total elapsed time of stirring in this vessel amounts to about one hour and 15 minutes. The final composition, upon standing at room temperature is a stiff, semi-solid paste of black color. Upon agitation it becomes flowable and may be sprayed or spread readily with a brush. The compositions of the invention are further characterized by adhering to a vertical surface without dripping or running down. When allowed to stand in containers they show no separation into layers and no settling out of the wood preservative particles dispersed therein. What is more important, these compositions show an entirely new behavior as to availability of the preservative chemicals to the wood. For example, the composition as exemplified last above was spread on a glass plate in a layer 0.030 inch thick. A similar composition was prepared with a low thinner content and omitting the thixotropic gel and the inert material, and was spread on a second glass plate in a layer of the same thickness. The two plates were immersed in a vessel of water and allowed to stand for 16 weeks without agitation. The composition of this invention gave up to the water from 95-100% of its water-soluble preservative chemicals while the second composition containing no gel or inert material or high thinner content gave up only 30-35% of its water-soluble preservative chemicals. The present composition resists removal by rain because of its semi-solid physical form. Thus the water-soluble wood preservative chemicals in the present composition are substantially completely available for impregnation of the wood where the composition is applied, because it adheres to vertical surfaces and resists physical washing off by rain. The properties of the present non-aqueous composition are also such that it can be applied readily at temperatures as low as 20° F. or lower, without resort to heating, as was formerly necessary. It is to be understood that the procedure for forming the compositions may be varied in many ways. It is essential only that the gel be formed, with or without heat.

Since the compositions tend to flow when agitated they may be applied to wood by brushing, or they may be continuously agitated and applied by spraying. Further, timber or logs to be treated may be placed in a vat, the applicable composition added, and the vat rocked or vibrated to cause the timber to agitate the composition, which thus becomes fluid and coats the timber or wood. The compositions may also be rendered fluid by heating and applied while hot.

I claim:

1. A thixotropic composition for preserving moisture containing wood consisting of a non-aqueous gel structure composed of a liquid hydrocarbon at least a portion of which is volatile and a gel forming agent selected from the group consisting of the saturated and unsaturated fatty acids which contain from 8 to 18 carbon atoms and the metal salts of said acids, said gel structure having a stable water-soluble mycocide wood preservative distributed as finely divided particles throughout the same, and said composition having a solid, inert filler material substantially uniformly distributed throughout the composition.

2. A composition as defined in claim 1 wherein the water-soluble mycocide wood preservative is inorganic.

3. A composition as defined in claim 1 wherein the water-soluble mycocide wood preservative is organic.

4. A composition as defined in claim 1 wherein the water-soluble mycocide wood preservative consists of approximately 45% by weight of sodium fluoride, approximately 2% by weight of potassium bichromate and approximately 3.5% by weight of dinitrophenol, each based on the weight of the composition.

5. A thixotropic composition for preserving moisture containing wood consisting of approximately 45% by weight of sodium fluoride, 2% by weight of potassium bichromate and 3.5% by weight of dinitrophenol dispersed as finely divided particles in a non-aqueous gel structure composed of a fluent hydrocarbon solvent, together with a gelling agent selected from the group consisting of the fatty acids which contain from 8 to 18 carbon atoms and the metal salts of said acids, said composition having a solid, inert filler material substantially uniformly distributed throughout the composition.

6. A thixotropic wood preserving composition for preserving moisture-containing wood consisting of approximately 45% by weight of sodium fluoride, 2% by weight of potassium bichromate and 3.5% by weight of dinitrophenol dispersed as finely divided particles in a non-aqueous gel structure composed of approximately 46% by weight of a hydrocarbon solvent and .75% by weight of a metal stearate, said composition having approximately 2% by weight of a solid, inert filler material distributed substantially uniformly throughout the composition.

7. The method of producing a thixotropic wood preserving agent which comprises the steps of dispersing a metal stearate in coal tar naptha, separately mixing dinitrophenol, potassium dichromate and asbestos fiber in coal tar having an average specific gravity of about 1.17, adding some of the metal stearate dispersion to the coal tar mixture with vigorous stirring, adding sodium fluoride to the mix and thereafter adding additional metal stearate dispersion with further stirring to produce a stiff, semi-solid paste which upon agitation may be applied to wood by brushing or spraying without dripping or running down the surface to which it is applied.

ROMAN H. CHRZANOWSKI.

REFERENCES CITED

The following references are of record in the file of this patent:

UNITED STATES PATENTS

| Number | Name | Date |
|---|---|---|
| 1,988,178 | Merrill | Jan. 15, 1935 |
| 2,012,975 | Schmittutz | Sept. 3, 1935 |
| 2,012,976 | Schmittutz | Sept. 3, 1935 |
| 2,089,612 | Kubelka | Aug. 10, 1937 |
| 2,194,218 | Dickeson | Mar. 19, 1940 |
| 2,277,048 | Leatherman | Mar. 24, 1942 |

OTHER REFERENCES

Cawley et al., J. Inst. Petroleum, volume 33, pages 649 to 672 (1947) thru Chemical Abstracts, volume 42, page 3938d.